United States Patent
Hussain et al.

(10) Patent No.: US 9,896,987 B2
(45) Date of Patent: Feb. 20, 2018

(54) CONTROLLER FOR EXHAUST HEAT CONVERSION TO HEAT AND ELECTRICITY

(71) Applicant: Ford Global Technologies, LLC, Dearborn, MI (US)

(72) Inventors: Quazi Hussain, Holland, OH (US); William Samuel Schwartz, Pleasant Ridge, MI (US); Chad Allan Baker, Ypsilanti, MI (US); David Richens Brigham, Ann Arbor, MI (US); Mark John Jennings, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 14/662,407

(22) Filed: Mar. 19, 2015

(65) Prior Publication Data
US 2016/0273435 A1 Sep. 22, 2016

(51) Int. Cl.
| | |
|---|---|
| *F01N 5/02* | (2006.01) |
| *B60L 11/18* | (2006.01) |
| *B60H 1/00* | (2006.01) |
| *F01N 9/00* | (2006.01) |
| *F01N 3/02* | (2006.01) |
| *B60H 1/02* | (2006.01) |
| *B60H 1/22* | (2006.01) |

(52) U.S. Cl.
CPC .............. *F01N 5/02* (2013.01); *B60H 1/004* (2013.01); *B60H 1/025* (2013.01); *B60L 11/1861* (2013.01); *F01N 3/0205* (2013.01); *F01N 5/025* (2013.01); *F01N 9/00* (2013.01); *B60H 2001/2275* (2013.01); *F01N 2240/20* (2013.01); *F01N 2590/11* (2013.01); *F01N 2900/104* (2013.01); *Y02T 10/16* (2013.01); *Y02T 10/20* (2013.01); *Y02T 10/47* (2013.01); *Y10S 903/905* (2013.01)

(58) Field of Classification Search
CPC . F01N 3/0205; F01N 5/00; F01N 5/02; F01N 5/025; F01N 9/00; F01N 2240/00; F01N 2240/02; F01N 2240/04; F01N 2240/20; F01N 2590/11; Y02T 10/16; Y02T 10/166; Y02T 10/62; Y02T 10/6213; Y02T 10/7005
See application file for complete search history.

(56) References Cited

U.S. PATENT DOCUMENTS

| | | | |
|---|---|---|---|
| 4,996,845 A | 3/1991 | Kim | |
| 7,077,776 B2 * | 7/2006 | Sorab | F16H 57/0413 165/276 |

(Continued)

*Primary Examiner* — Phutthiwat Wongwian
*Assistant Examiner* — Loren Edwards
(74) *Attorney, Agent, or Firm* — Frank MacKenzie; Brooks Kushman P.C.

(57) ABSTRACT

An exhaust gas heat recovery system for a vehicle is configured to selectively distribute a fluid heated by engine exhaust to a first path for generating electricity and a second path for heating one or more powertrain components of the vehicle. A controller selects a distribution of the fluid to the first and second paths based on minimizing a fuel consumption of an engine. The controller further selects a distribution of fluid to the powertrain components to minimize fuel consumption. The controller distributes the fluid according to the selected distribution.

18 Claims, 3 Drawing Sheets

(56) References Cited

U.S. PATENT DOCUMENTS

| | | | |
|---|---|---|---|
| 8,346,422 B2 * | 1/2013 | Chen | B60W 10/06 180/65.1 |
| 8,726,661 B2 * | 5/2014 | Spicer | F02G 1/043 60/299 |
| 2009/0205590 A1 | 8/2009 | Vetrovec | |
| 2014/0116050 A1 | 5/2014 | Seo | |
| 2014/0123642 A1 | 5/2014 | Kim | |
| 2014/0217953 A1 | 8/2014 | Chang | |

* cited by examiner

CONTROLLER FOR EXHAUST HEAT CONVERSION TO HEAT AND ELECTRICITY

TECHNICAL FIELD

This application is generally related to distributing a flow of fluid that is heated by engine exhaust in a vehicle to an engine heat exchanger and a heat-to-electricity generator.

BACKGROUND

A hybrid-electric vehicle (HEV) includes an internal combustion engine (ICE) and an electric machine that is powered by a traction battery. During a cold-start condition, the engine may be forced to run in order to bring the engine to a predetermined temperature. During cold weather conditions, there may be a demand for cabin heating that increases the period of time that the engine runs. This mode of operation may not be the most fuel efficient mode of operation. There may be lost opportunities during this time period in which the vehicle could have been operated in an electric-only mode.

SUMMARY

A vehicle includes an exhaust gas heat recovery system configured to selectively distribute a fluid heated by engine exhaust to a first path for generating electricity and a second path for heating one or more powertrain components.

In some configurations, the vehicle further includes a controller programmed to, in response to parameters indicating less fuel consumption associated with distributing the fluid through the first path as compared with the second path, distribute the fluid to the first path. The controller may be further programmed to, in response to parameters indicating greater fuel consumption associated with distributing the fluid through the first path as compared with the second path, distribute the fluid to the second path. The controller may be further programmed to, in response to parameters indicating a minimum fuel consumption associated with a distribution of the fluid between the second path and the first path, distribute the fluid between the second path and the first path according to the distribution. The controller may be further programmed to, in response to a temperature of an engine being less than a predetermined temperature in a presence of a demand for cabin heating, distribute the fluid to the second path and request the engine to be in a running state.

In some configurations, the exhaust gas heat recovery system may be further configured to selectively distribute the fluid flowing through the second path to a first heat exchanger for heating an engine and to a second heat exchanger for heating a transmission. The controller may be further programmed to distribute the fluid flowing through the second path according to a distribution between the first heat exchanger and the second heat exchanger that results in minimum fuel consumption.

In some configurations, the vehicle further includes a controller programmed to, in response to parameters indicating a minimized fuel consumption associated with a selected one of a plurality of possible distribution combinations for the first and second paths, distribute the fluid according to the selected one.

The controller may be further programmed to, in response to an engine temperature being below a predetermined temperature in a presence of a demand for cabin heating, distribute the fluid to the second path and request the engine to be in a running state. The controller may be further programmed to distribute the fluid to the second path in response to an engine temperature being less than a predetermined temperature. The controller may be further programmed to request an engine start in response to the engine temperature being less than the predetermined temperature.

The vehicle may further include a battery and the parameters may include one or more of a state of charge of the battery, and a capacity of the battery. The vehicle may further include at least one electrical load, and the parameters may include a power demand of the at least one electrical load. The parameters may include an engine temperature. The parameters may include a speed-load profile of the engine. The parameters may include an ambient temperature.

In some configurations, the powertrain includes an engine and a transmission and the exhaust gas heat recovery system may be further configured to selectively distribute the fluid flowing through the second path to a first heat exchanger for heating the engine and a second heat exchanger for heating the transmission. The controller may be further programmed to distribute the fluid according to a distribution between the first heat exchanger and the second heat exchanger that results in minimum fuel consumption.

A method includes heating a fluid with exhaust gas from an engine, and distributing, by a controller, the fluid between a first path for generating electricity and a second path for heating a powertrain to reduce fuel consumption of the engine. Distributing the fluid may be based on one or more of an engine temperature and an ambient temperature. The method may further include distributing, by the controller, the fluid to the second path for heating the engine in response to the engine temperature being less than a predetermined temperature. The powertrain may include the engine and a transmission, and the method may further include distributing the fluid flowing to the second path to a first heat exchanger associated with the transmission and a second heat exchanger associated with the engine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
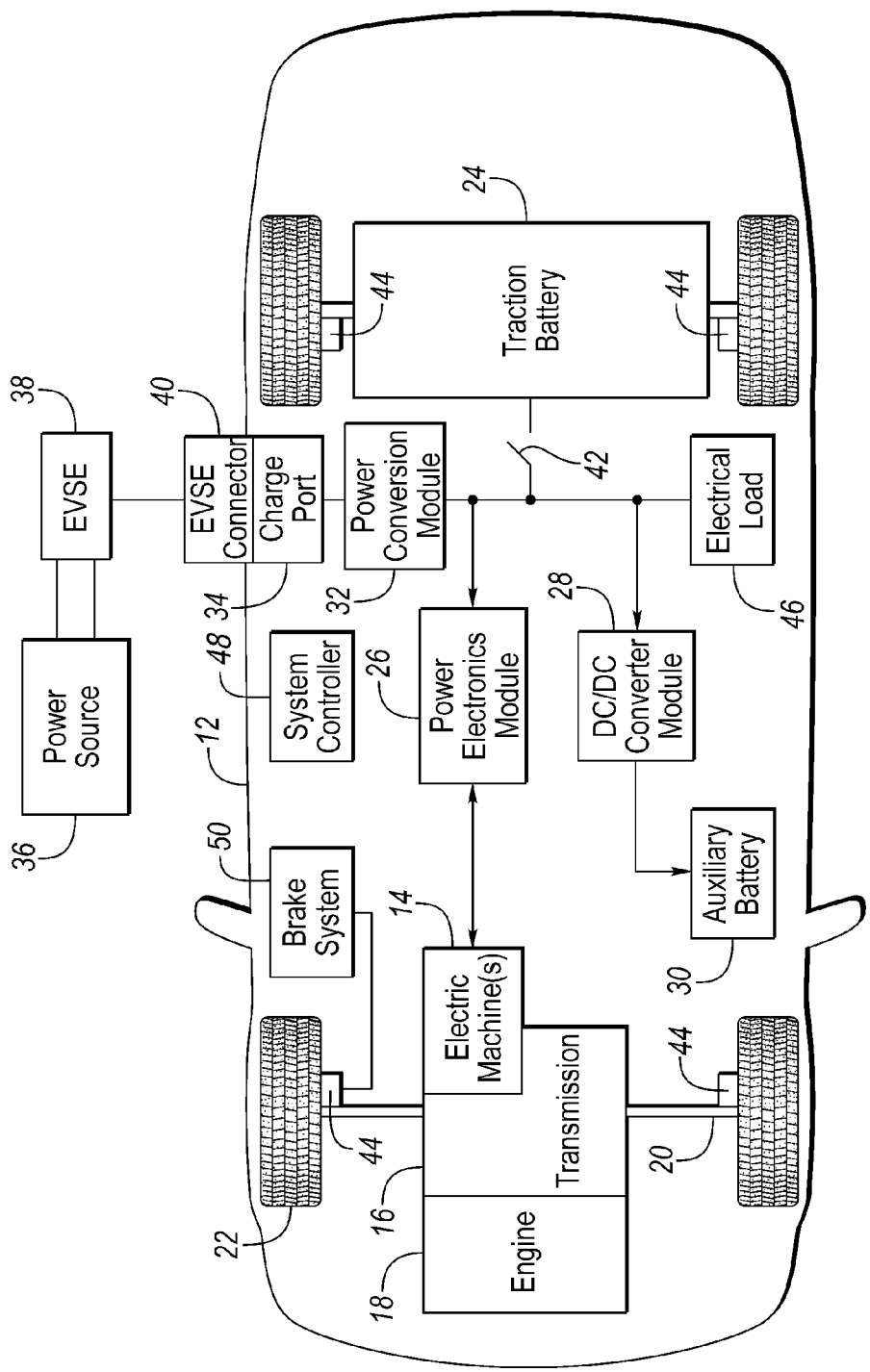
FIG. 1 is a diagram of a hybrid vehicle illustrating typical drivetrain and energy storage components.

FIG. 1 depicts a typical plug-in hybrid-electric vehicle (PHEV), although a conventional hybrid-electric vehicle is equally relevant for the concepts disclosed herein. A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. A powertrain may include those components that generate torque and deliver that torque to a surface of the road to propel the vehicle. The powertrain may include the engine 18, the hybrid transmission 16, the drive shaft 20, and the electric machines 14.

A traction battery or battery pack 24 stores energy that can be used by the electric machines 14. A vehicle battery pack 24 typically provides a high voltage DC output. The traction battery 24 is electrically coupled to one or more power electronics modules. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a typical traction battery 24 may provide a DC voltage while the electric machines 14 may operate with a three-phase AC current to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage required by the traction battery 24. The description herein is equally applicable to a pure electric vehicle.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery). The low-voltage systems may be electrically connected to the auxiliary battery. Other high-voltage loads 46, such as compressors and electric heaters, may be coupled to the high-voltage output of the traction battery 24.

The vehicle 12 may be a plug-in hybrid vehicle in which the traction battery 24 may be recharged by an external power source 36. The external power source 36 may be a connection to an electrical outlet. The external power source 36 may be an electrical power distribution network or grid as provided by an electric utility company. The external power source 36 may be electrically coupled to a charger or electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. A system controller 48 may be present to coordinate the operation of the various components.

The hybrid-electric vehicle (HEV) may be configured to maximize fuel economy. Under some operating conditions, fuel economy may be decreased. One such condition is when the vehicle 12 is initially started, particularly in cold weather conditions. During a cold start, the hybrid operating strategy may keep the engine 18 running until a predetermined engine temperature is achieved. Until this predetermined engine temperature is reached, the full HEV functionality may not be utilized. That is, the vehicle 12 may not operate in an electric-only mode of operation until the engine 18 is warmed up. Other conditions for operating in the electric-only mode may be satisfied during this time, but operation in the electric-only mode may be inhibited due to the engine temperature. These conditions may lead to increased fuel consumption during the time in which the engine 18 is warmed up.

In addition to warming the engine 18, there may be a demand for cabin heating. Cabin heating demand may draw some of the heat from the engine 18 leading to an increased warm up time for the engine 18. This may increase the amount of time that the engine 18 is running during a cold start situation before allowing full HEV operation. In order to provide heat to the cabin, the engine 18 may be operated at a higher minimum temperature than in the absence of cabin heat demand. If the engine temperature falls below the minimum temperature threshold, the engine 18 may be turned on maintain the temperature above the minimum temperature threshold. Heating the engine 18 to a predetermined temperature as quickly as possible may improve HEV fuel economy. Further, during a cold-start condition, heating the powertrain components 140, such as the transmission 16, as quickly as possible may improve HEV fuel economy.

Figure 2:
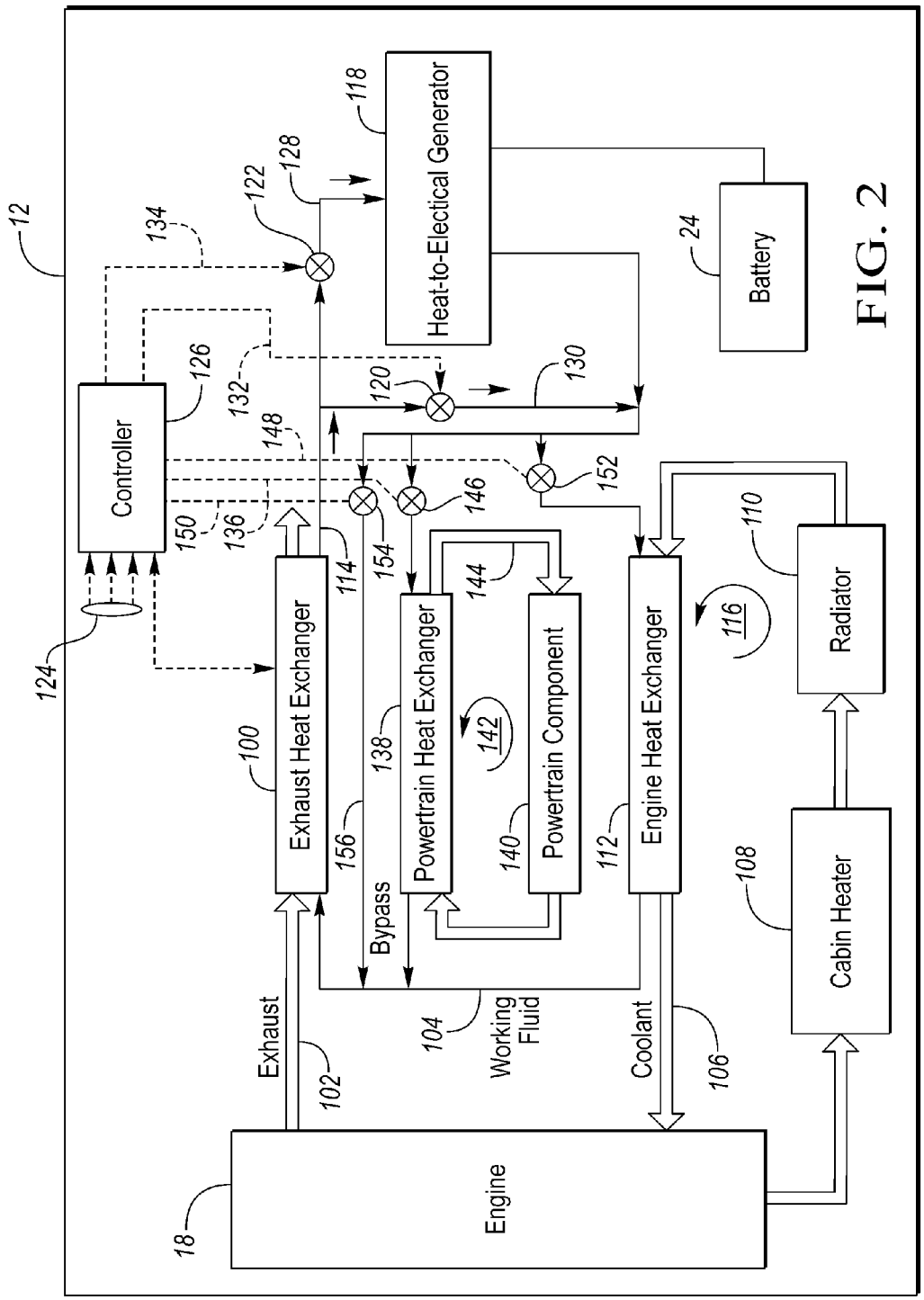
FIG. 2 is a diagram of a vehicle configuration that includes a heat-to-heat device and a heat-to-electricity device.

One source of heat that is not normally utilized is exhaust waste heat. FIG. 2 depicts an example of a vehicle 12 that includes an exhaust gas heat recovery system. As a result of the combustion process in the engine 18, exhaust gas 102 becomes heated and is routed out of the engine 18 through an exhaust system. The exhaust gas 102 may be routed through various components configured to reduce emissions and noise. The heated exhaust gas 102 may ultimately be vented to the environment. As the exhaust gas 102 flows through the exhaust system, the heated exhaust gas 102 may pass through various exhaust components and transfer heat to the exhaust components.

One way to utilize the exhaust waste heat may be to couple an exhaust heat exchanger 100 in the exhaust stream 102 to transfer the heat from the exhaust gas 102 to a working fluid 104. Over time, a temperature of the working fluid output 114 may increase. The heated working fluid 114 may be distributed to other devices to utilize the heat.

The exhaust heat exchanger 100 may be coupled to the exhaust system. In some configurations, the exhaust heat exchanger 100 may heat the working fluid 104. The working fluid 104 may be a gas or liquid and may be contained in tubes or pipes to form a closed loop or circuit. Within the exhaust heat exchanger 100, a channel for the working fluid 104 may be configured in a coil, parallel rows, or otherwise configured to increase an amount of surface area of the channel within the exhaust heat exchanger 100. The exhaust heat exchanger 100 may include a fluid inlet for the working fluid 104 to flow into the exhaust heat exchanger 100. The exhaust heat exchanger 100 may include a fluid outlet for the working fluid 104 to flow out of the exhaust heat exchanger 100. The exhaust heat exchanger 100 may include a gas inlet and a gas outlet for the exhaust gas 102. The exhaust gas 102 may pass through an exhaust channel within the exhaust heat exchanger 100. The exhaust channel may be configured to increase an amount of exhaust gas that can transfer heat to the working fluid channel within the exhaust heat exchanger 100. As exhaust gases 102 pass through the exhaust channel, heat is transferred to the working fluid 104 that flows through the exhaust heat exchanger 100. The output may be the heated working fluid 114. The channels may be constructed of a material having a high thermal conductivity. The exhaust heat exchanger 100 may be configured to include materials of high thermal conductivity between the exhaust gas channel and the working fluid channel. In some configurations, a pump may circulate the working fluid 104 through the system.

A typical vehicle with an internal combustion engine 18 may utilize an engine coolant loop 116 to control the temperature of the engine 18. During operation, the temperature of the engine 18 increases due to the combustion process and friction of moving components. A pump may be included to circulate coolant 106 through the engine coolant loop 116. Coolant 106 flowing through the engine coolant loop 116 flows through the engine 18. As the coolant 106 flows through the engine 18, heat is transferred from the engine 18 to the coolant 106. The coolant 106 may flow through a cabin heat exchanger 108 to transfer heat from the coolant 106 to the passenger cabin. The coolant 106 may then flow through a radiator 110 that transfers heat from the coolant 106 to the environment. The cycling of coolant 106 through the engine 18 and radiator 110 helps to maintain the engine temperature below a certain maximum temperature to prevent overheating the engine 18.

In addition to removing heat from the engine 18, the coolant loop 116 may also be used to transfer heat to the engine 18. If the temperature of the coolant 106 flowing to the engine 18 is greater than the engine temperature, heat may be transferred from the coolant 106 to the engine 18.

The vehicle 12 may include a powertrain coolant loop 142 to control the temperature of one or more powertrain components 140. The powertrain coolant loop 142 may be configured to remove heat from the powertrain components 140, such as the transmission 16. In addition to removing heat, the powertrain coolant loop 142 may be used to transfer heat to the powertrain components 140. The powertrain coolant loop 142 may include a pump to circulate the powertrain coolant 144. The vehicle 12 may be configured to have multiple powertrain coolant loops 142. The powertrain coolant loop 142 may also be used to transfer heat to the powertrain components 140.

An engine heat exchanger 112 may be configured to receive the heated working fluid 114 and transfer heat to the engine coolant loop 116. The working fluid 114 and engine coolant 106 may flow through separate channels or networks of tubes within the engine heat exchanger 112. The network of tubes may be configured to increase an amount of surface area within the engine heat exchanger 112. The area between the separate networks of tubes may include a material having high thermal conductivity to increase the flow of heat between the tubes. As the working fluid 114 circulates through the engine heat exchanger 112, heat may be transferred to the coolant 106 in the engine coolant loop 116. This may be referred to as a heat-to-heat transfer as heat from the exhaust gas 102 is ultimately transferred to heat the engine 18. During a cold start condition, the temperature of the heated working fluid 114 may increase faster than the temperature of the engine coolant 106. By heating the engine coolant 106 with the exhaust waste heat, the engine 18 may be warmed up faster than in the absence of the heat-to-heat transfer.

A powertrain heat exchanger 138 may be configured to receive the heated working fluid 114 and transfer heat to the powertrain coolant loop 142. The working fluid 114 and powertrain coolant 144 may flow through separate channels or networks of tubes within the powertrain heat exchanger 138. The network of tubes may be configured to increase an amount of surface area within the powertrain heat exchanger 138. The area between the separate networks of tubes may include a material having high thermal conductivity to increase the flow of heat between the tubes. As the working fluid 114 circulates through the powertrain heat exchanger 138, heat may be transferred to the powertrain coolant 144 in the powertrain coolant loop 142. This may be referred to as a heat-to-heat transfer as heat from the exhaust gas 102 is ultimately transferred to heat the powertrain component 140. During a cold start condition, the heated working fluid 114 may heat up faster than the powertrain coolant 144. By heating the powertrain coolant 144 with the exhaust waste heat, the powertrain component 140 may be warmed up faster than in the absence of the heat-to-heat transfer. The powertrain component 140 may be a transmission or transaxle, a differential, gearbox, transfer case or any component in the powertrain.

In some configurations, the powertrain component 140 may be the transmission 16. The powertrain coolant 144 may be transmission fluid. In some configurations, the powertrain coolant 144 may be routed through the radiator 110 or a separate powertrain radiator (not shown) to transfer heat from the powertrain coolant 144 to the environment. Additional powertrain components may be heated by including additional heat exchangers in a similar configuration. For example, a heat exchanger loop may be configured to transfer heat from the heated working fluid 114 to coolant that flows through a transfer case. Although two heat-to-heat transfer devices are depicted, some configurations may include additional heat-to-heat transfer devices.

Another way to utilize the exhaust waste heat may be to include a heat-to-electricity device 118 to convert the heat from the exhaust gas 102 into electrical energy. For example, the working fluid 104 may be heated to evaporation and expanded in a turbine to drive a generator. A solid-state thermoelectric device that converts heat into electricity may also be placed in the exhaust stream. The conversion of heat to electricity may be referred to as a heat-to-electricity transfer as heat from the exhaust gas 102 is converted to electrical energy. The electrical energy produced may be stored in the battery 24 and used by electrical loads within the vehicle. The energy may also be used to propel the vehicle 12.

The vehicle 12 may include one or more heat-to-heat transfer devices 112, 138 and a heat-to-electricity transfer device 118. The heated working fluid 114 may be distributed to a first path 128 for generating electricity. The heated working fluid 114 may be distributed to a second path 130 for heating the powertrain of the vehicle 12. A thermal system controller 126 may manage the distribution of the heated working fluid 114 through each of the heat exchangers 112, 118, 138 to maximize fuel economy of the vehicle 12. The controller 126 may select a mode of operation, heat-to-heat, heat-to-electricity, or some combination thereof that maximizes fuel economy. Further, the controller 126 may select the distribution of the heated working fluid 114 for heating the various powertrain components (e.g., engine, transmission) to maximize fuel economy.

The engine heat exchanger 112 may reduce fuel consumption by increasing the temperature of the engine 18 during start conditions. The powertrain heat exchanger 138 may reduce fuel consumption by increasing the temperature of the associated powertrain component 140 during start conditions. For example, increasing the temperature of the engine 18 and powertrain component 140 (e.g., transmission 16) may decrease friction within the powertrain. The exhaust heat may aid in increasing the temperature of the powertrain components to a predetermined minimum temperature in less time. Faster powertrain heating times may allow the vehicle 12 to operate in a full-HEV mode in a reduced amount of time after starting a drive cycle and result in improved fuel economy.

The heat-to-electricity transfer device 118 may reduce fuel consumption by reducing the electrical energy demand that is sourced by the engine 18 through the electric machine 14. In addition, the electric machine 14 may operate at a decreased power level which may decrease the load on the engine 18. The additional electric energy may lead to less engine 18 operation or operation at reduced engine power levels which may decrease fuel consumption of the engine 18.

The thermal system controller 126 may be configured to control the distribution of the heated working fluid 114 to the various heat-transfer devices 112, 118, 138 during operation of the vehicle 12. The exhaust gas heat recovery system may include one or more valves 120, 122, 146, 152, 154 coupled to the working fluid loop 114 to control the flow of the heated working fluid 114 through the system. In some configurations, the valves 120, 122, 146, 152, 154 may be on/off type valves. In some configurations, the valves 120, 122, 146, 152, 154 may be proportional type valves in which a flow of fluid through the valve depends on a current or voltage supplied to the valve. The control signals 132, 134, 136, 148, 150 to operate the valves 120, 122, 146, 152, 154 may be configured to operate relays or solenoids. The thermal system controller 126 may include circuitry to provide appropriate voltage and current levels for the control signals 132, 134, 136, 148, 150 to operate the valves 120, 122, 146, 152, 154. The control signals 132, 134, 136, 148, 150 may be pulse-width modulated or may be analog voltage and current signals depending on the type of valves 120, 122, 146, 152, 154 used.

A first valve 122, also referred to as a heat-to-electricity (H2E) distribution valve, may distribute the flow of heated working fluid 114 to the first path 128 for generating electricity. The thermal system controller 126 may output a first control signal 134 to control the H2E distribution valve 122. The flow of working fluid 114 to the first path 128 may be controlled by operation of the H2E distribution valve 122.

A second valve 120, also referred to as a heat-to-powertrain (H2P) distribution valve, may distribute the flow of heated working fluid 114 to the second path 130 for heating the powertrain of the vehicle 12. The thermal system controller 126 may output a second control signal 132 to control the H2P distribution valve 120. The thermal system controller 126 may control the amount of heated working fluid 114 that is distributed to the powertrain and the heat-to-electricity generator by operation of the H2E distribution valve 122 and the H2P distribution valve 120.

A third valve 146, also referred to as a powertrain heat exchanger (PHE) distribution valve, may distribute the flow of heated working fluid 114 to the powertrain heat exchanger 138 for heating the powertrain component 140. The thermal system controller 126 may output a third control signal 136 to control the PHE distribution valve 146. A fourth valve 152, also referred to as an engine heat exchanger (EHE) distribution valve, may distribute the flow of the heated working fluid 114 to the engine heat exchanger 112 for heating the engine 18. The thermal system controller 126 may output a fourth control signal 148 to control the EHE distribution valve 152. Other configurations may include different valve configurations to achieve a similar distribution of the heated working fluid 114 through the system.

A powertrain bypass valve 154 may be used to distribute the flow of heated working fluid 114 back to the exhaust heat exchanger 100. The thermal system controller 126 may output a bypass valve control signal 150 to control the powertrain bypass valve 154. The powertrain bypass valve 154 may be actuated during time periods when the working fluid 104 is being heated. The thermal system controller 126 may distribute the heated working fluid 114 through the second valve 120 and through the powertrain bypass valve 154 during a warmup period. During the warmup period, a temperature of the heated working fluid 114 may be less than a predetermined temperature. During the warmup period, the temperature of the heated working fluid 114 may be increasing. When the temperature of the heated working fluid 114 is less than the predetermined temperature, the heated working fluid 114 may actually be decreased when distributed to the powertrain heat exchanger 138 or the engine heat exchanger 112. In some configurations, the predetermined temperature may be a temperature of the engine coolant 106 or the powertrain coolant 144.

In some configurations, the H2P distribution valve 120 may control the flow of heated working fluid 114 to the engine heat exchanger 112 and the powertrain heat exchanger 138, and the H2E distribution valve 122 may control the flow of heated working fluid 114 to the heat-to-electricity conversion device 118. The thermal system controller 126 may selectively control the H2E distribution valve 122 and H2P distribution valve 120 to distribute the heated working fluid 114 through the associated paths. The system may be configured to selectively distribute the fluid 114 heated by the engine exhaust through the first path 128 for generating electricity and through the second path 130 for heating the engine 18 and the powertrain component 140 by operation of the associated valves 120, 122.

In some configurations, the working fluid output of the heat-to-electricity conversion device 118 may be routed through the engine heat exchanger 112 or the powertrain heat exchanger 138. In this configuration, residual heat remaining in the working fluid 114 may be transferred to the engine heat exchanger 112 or the powertrain heat exchanger 138. The thermal system controller 126 may also inhibit heating of the powertrain by activating the powertrain bypass valve 154.

The thermal system controller 126 may operate the valves 120, 122, 146, 152, 154 to route the heated working fluid 114 to the associated heat-transfer device. For example, during a cold start conditions, the H2P distribution valve 120 and the EHE distribution valve 152 may be actuated to allow the heated working fluid 114 to flow to the engine heat exchanger 112 through the second path 130. The H2E distribution valve 122 may be deactivated so that no heated working fluid 114 flows to the heat-to-electricity device 118. In this mode, the heated working fluid 114 may be used to heat the coolant 106 in the engine coolant loop 116. In this manner, the engine temperature may be increased to a desired operating temperature in less time.

When the engine temperature has reached a predetermined temperature or as inferred from other signals 124 that are coupled to the thermal system controller 126, the H2P distribution valve 120 and the EHE distribution valve 152 may be deactivated to prevent the heated working fluid 114 from flowing to the engine heat exchanger 112. The H2E distribution valve 122 may be activated to allow the heated working fluid 114 to flow to the heat-to-electricity transfer device 118. In this mode of operation, the heat of the heated working fluid 114 may be transferred to electrical energy.

In some configurations, the H2P distribution valve 120 and the PHE distribution valve 146 may be actuated to allow the heated working fluid 114 to flow to the powertrain heat exchanger 138 through the second path 130. The H2E distribution valve 122 may be deactivated so that no heated working fluid 114 flows to the heat-to-electricity device 118. In this mode, the heated working fluid 114 may be used to heat the powertrain coolant 144 in the powertrain coolant loop 142. In this manner, the powertrain component temperature may be increased to a desired operating temperature in less time.

Various modes of operation may be defined by selection of valve combinations. The thermal system controller 126 may determine the desired valve combinations to achieve maximum fuel economy. A H2E generating mode may be defined by activation of the H2E distribution valve 122 and the powertrain bypass valve 154. In the H2E generating mode, electricity may be generated and the engine 18 and powertrain components 140 are not heated.

A combination electricity generating and powertrain heating mode may be defined by activation of the H2E distribution valve 122 and any combination of the PHE distribution valve 146 and the EHE distribution valve 152. In this mode of operation, electricity may be generated and one or more of the engine 18 and the powertrain component 140 may be heated. In some configurations, the H2P distribution valve 120 may be actuated to increase a distribution of heated working fluid 114 used for powertrain heating.

An engine heating mode may be defined by activation of the H2P distribution valve 120 and the EHE distribution valve 152. In this mode of operation, the engine coolant 106 is heated.

A powertrain component heating mode may be defined by activation of the H2P distribution valve 120 and the PHE distribution valve 146. In this mode of operation, the powertrain coolant 144 is heated.

A powertrain heating mode may be defined by activation of the H2P distribution valve 120, the PHE distribution valve 146, and the EHE distribution valve 152. In this mode of operation, the engine 18 and the powertrain component 140 (e.g., transmission) may be heated. In some configurations, a proportion of fluid directed through the PHE distribution valve 146 and the EHE distribution valve 152 may be varied such that the engine coolant 106 and the powertrain coolant 144 are heated at different rates. The thermal system controller 126 may distribute the heated working fluid 114 based on minimum fuel consumption. The thermal system controller 126 may determine the path for the heated working fluid 114 that results in the lowest fuel consumption.

A warmup mode may be defined by activation of the H2P distribution valve 120 and the powertrain bypass valve 154. In this mode of operation, the working fluid 104 is circulated through the exhaust heat exchanger 100 in order to heat up the working fluid 104. In this mode, no electricity is generated and no powertrain systems are heated. This mode may also be used when conditions are present in which the working fluid 114 cannot be distributed to the other paths. Such conditions may include diagnostic features that may request prohibiting the flow of heated working fluid 114 through the paths.

The thermal system controller 126 may include logic to determine a distribution that minimizes fuel consumption of the engine 18. The thermal system controller 126 may select an operating mode as described that minimizes fuel consumption.

The thermal system controller 126 may include stored information on fuel economy gains (or fuel consumption reductions) that arise from a given quantity of additional heat to the engine 18, transmission 16, and other powertrain components under a variety of operating conditions. Additionally, the thermal system controller 126 may include stored information on the amount of electrical energy generated by the additional heat and the effect of that electrical energy on fuel economy. The thermal system controller 126 may process various operational parameters 124 to determine which mode of operation causes the largest gain in fuel economy. For a given set of operating parameters 124, the thermal system controller 126 may compute the change in fuel consumption associated with an additional amount of heat to the engine 18, an additional amount of heat to the powertrain components 140, and an additional amount of electricity generated may be computed.

Figure 3:
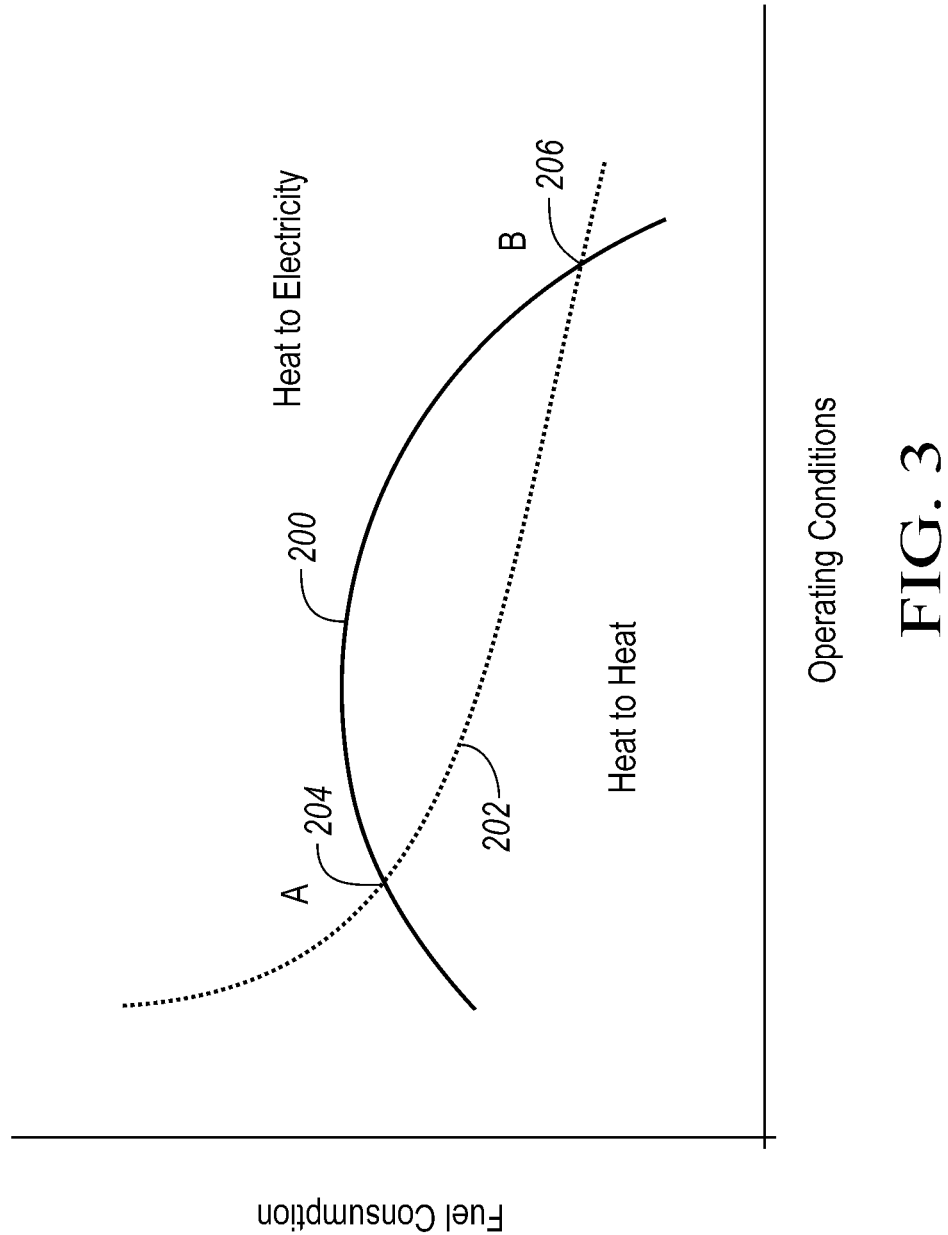
FIG. 3 is an example plot of fuel consumption as a function of operating conditions for distributions of heated fluid to a heat-to-heat device and a heat-to-electricity generator.

FIG. 3 depicts an example plot of fuel consumption as a function of operating conditions or parameters. The curves displayed are only one possible set of curves. The specific curves may depend on the operating conditions selected and the characteristics of fuel consumption for the specific vehicle. A heat-to-electricity curve 200 shows the response of fuel consumption associated with distributing the heated fluid 114 to the heat-to-electricity generator 118 as operating conditions vary. A heat-to-heat curve 202 shows the response of fuel consumption associated with distributing the heated fluid 114 to the heat-to-heat transfer devices 112, 138. The operating conditions may represent one or more of the operating parameters. In some configurations, a series of similar plots or tables may be used. At point A 204, the two curves intersect. When the operating conditions are less than the value at point A 204, the heat-to-electricity curve 200 yields lower fuel consumption. For improved fuel economy, the heated fluid 114 may be distributed to the heat-to-electricity generator 118 through the first path 128. Between point A 204 and point B 206, fuel consumption for the heat-to-heat curve 202 is less than the heat-to-electricity curve 200. For operating conditions between point A 204 and point B 206, the heated working fluid 114 may be distributed to one or more of the heat-to-heat transfer devices 112, 138 through the second path 130 for best fuel economy. When the operating conditions are greater than the value at point B 206, the heat-to-electricity curve 200 yields lower fuel consumption. For operating conditions greater than that value at point B 206, the heated working fluid 114 may be distributed to the heat-to-electricity generator 118.

Parameters that may be considered when selecting the distribution of the heated working fluid 114 may include an engine temperature, an ambient temperature, a temperature dependent engine friction loss, an accessory electrical load, a battery state of charge (SOC), a battery capacity, and a speed-load profile. Additional parameters may include temperatures and friction profiles associated with the powertrain components 140 (e.g., transmission 16). These factors may be dynamic and vary over time. Therefore, the optimal distribution may vary over time based on these parameters.

Referring again to FIG. 2, the thermal system controller 126 may consider various operating parameters 124 in determining the distribution of the working fluid 104. Some selection criteria may be based on one or more of the various operating parameters 124. An engine temperature sensor may be associated with the engine 18 and an engine temperature value may be obtained by sampling the engine temperature sensor. For example, when the engine temperature is below a predetermined threshold, the thermal system controller 126 may select the heat-to-heat transfer device 112 to increase the engine temperature. The thermal system controller 126 may include a table of fuel consumption as a function of engine temperature.

In some configurations, an ambient temperature may be utilized. The vehicle may include an ambient temperature sensor that may be sampled to obtain the ambient temperature value. For example, if the ambient temperature is in a predetermined range that is indicative of warm weather, the thermal system controller 126 may prioritize electricity generation over engine heating. This may be especially true for a PHEV that has an extended electric range. In a warm weather condition, there may be no need for cabin heating. It is possible that a drive cycle may be completed solely on electrical energy.

Some configurations may consider a demand for cabin heating or other activity that requires that the engine 18 be running for a period of time. The demand for cabin heating may change the mode selection strategy. The demand for cabin heating may be determined based on cabin heating control selections and the ambient temperature. In the presence of the demand for cabin heating, the thermal system controller 126 may select the heat-to-heat transfer path 130 when the engine temperature is below the predetermined temperature. Further, the thermal system controller 126 may request the engine to be in a running state. For example, the thermal system controller 126 may be configured to communicate an engine start request to an engine controller to place the engine in the running state.

Other operating parameters may relate to the electrical demand of the vehicle 12. For example, the amount of power used by accessory electrical loads 46 may be monitored. Under some conditions, the thermal system controller 126 may prioritize electricity generation over engine heating. For example, when the electrical demand from accessory electrical loads 46 is high, the controller may select the electricity generating path 128.

The distribution of the heated fluid 114 may also be based on a vehicle acceleration demand. For example, during a demand for rapid vehicle acceleration, it may be desired to transfer maximum engine power to the drive wheels. Using the electric machine 14 coupled to the engine 18 to generate electricity may reduce the amount of torque transferred to the driven wheels. Under these conditions, the thermal system controller 126 may select the heat-to-electricity path 128 to generate electrical energy so that the load on the engine 18 may be decreased.

The battery SOC may be considered in the distribution process. For example, when the battery SOC is above a predetermined threshold, the thermal system controller 126 may select the heat-to-heat transfer path 130. In some configurations, it may not be desired to operate the battery 24 at high SOC levels. The thermal system controller 126 may attempt to prevent raising the battery SOC to such a high level.

Operating parameters such as engine friction loss and speed-load profile may relate to fuel consumption. The engine friction loss may be temperature dependent and the thermal system controller 126 may distribute the heated working fluid 114 to maintain the engine 18 at a temperature which minimizes the engine friction loss. The thermal system controller 126 may select the distribution mode to adjust the load on the engine 18 to optimize the fuel consumption. Since the electric machine 14 draws power from the engine 18 when operating as a generator, the thermal system controller 126 may select the heat-to-electricity path 128 to reduce the power demand on the engine 18.

A working fluid temperature sensor may be present that outputs a signal indicative of the working fluid temperature to the thermal system controller 126. The working fluid temperature may be used to control the distribution of the working fluid 114. An engine coolant temperature sensor and a powertrain coolant temperature sensor may be included that output a signal to the thermal system controller 126.

The powertrain component 140 may include a temperature sensor that is configured to provide a signal indicative of the powertrain component temperature. A friction loss table may be stored as a function of the powertrain component temperature. Overall powertrain component efficiency may also be stored in the memory of the thermal system controller 126.

During operation, the thermal system controller 126 may monitor and assess the operating parameters 124 to determine the most fuel efficient mode of operation. The operating parameters 124 may be processed individually and prioritized. Fuel consumption associated with the operating parameters 124 or combinations of the parameters 124 may be stored in one or more lookup tables. The operating parameters 124 may be used to index into the lookup tables for selecting the distribution mode having the minimum fuel consumption. The lookup tables may be generated off-line and stored in controller memory for usage during vehicle operation. The thermal system controller 126 may operate the valves according to the selected mode of operation.

The thermal system controller 126 may implement instructions to receive, measure and compute the various operating parameters. The controller 126 may use the operating parameters to determine the distribution of the heated working fluid 114 that is associated with the minimum fuel consumption. The thermal system controller 126 may be programmed to operate the valves to distribute the heated working fluid 114 to the heat-to-heat transfer devices 112, 138 and to the heat-to-electricity device 118 according to the selected distribution. In some configurations, the thermal system controller 126 may select from a plurality of distribution combinations.

The thermal system controller 126 may select a distribution of heated working fluid 114 to the first path 128 for generating electricity and the second path 130 for heating the engine 18 and powertrain component 140 based on minimum fuel consumption. When the operating parameters 124 indicate greater fuel consumption associated with distributing the heated working fluid 114 through the second path 130 as compared with the first path 128, the fluid 114 may be distributed to the first path 128. When the operating parameters 124 indicate greater fuel consumption associated with distributing the fluid through the first path 128 as compared with the second path 130, the fluid 114 may be distributed to the second path 130. A proportion of heated working fluid 114 distributed to the first path 128 and the second path 130 may be based on minimum fuel consumption. Distribution combinations may be identified in which a first proportion of heated working fluid 114 is distributed for generating electricity and a second proportion of heated working fluid 114 is distributed for heating the engine 18 and powertrain components 140. The heated working fluid 114 may be distributed according to the distribution combination having the minimum fuel consumption. The heated working fluid 114 through the second path 130 may be further distributed between the powertrain heat exchanger 138 and the engine heat exchanger 112 based on the minimum fuel consumption.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a battery;
an exhaust gas heat recovery system including a plurality of valves configured to selectively distribute a fluid heated by engine exhaust through a first path for generating electricity and a second path for heating one or more powertrain components; and
a controller programmed to, responsive to parameters, including one or more of a battery state of charge and a battery capacity, indicating less fuel consumption associated with distributing the fluid to the first path as compared with the second path, actuate the valves to distribute the fluid to the first path.

2. The vehicle of claim 1 wherein the one or more powertrain components includes an engine and a transmission.

3. The vehicle of claim 1 wherein the controller is further programmed to, in response to parameters indicating greater fuel consumption associated with distributing the fluid to the first path as compared with the second path, actuate the valves to distribute the fluid to the second path.

4. The vehicle of claim 3 wherein the valves are further configured to selectively distribute the fluid flowing through the second path to a first heat exchanger for heating an engine and to a second heat exchanger for heating a transmission, and the controller is further programmed to actuate the valves to distribute the fluid flowing through the second path according to a distribution between the first heat exchanger and the second heat exchanger that results in minimum fuel consumption for the parameters.

5. The vehicle of claim 1 further including at least one electrical load, and wherein the parameters include a power demand of the at least one electrical load.

6. The vehicle of claim 1 wherein the parameters include one or more of a speed-load profile of an engine, an ambient temperature, and an engine temperature.

7. The vehicle of claim 1 wherein the controller is further programmed to, in response to parameters indicating minimum fuel consumption associated with a distribution of the fluid between the second path and the first path, actuate the valves to distribute the fluid between the second path and the first path according to the distribution.

8. The vehicle of claim 1 wherein the controller is further programmed to, in response to a temperature of an engine being less than a predetermined temperature in a presence of a demand for cabin heating, actuate the valves to distribute the fluid to the second path and request the engine to be in a running state.

9. A vehicle comprising:
an exhaust gas heat recovery system including a plurality of valves configured to selectively distribute a fluid heated by engine exhaust between a first path for generating electricity and a second path for heating a powertrain; and
a controller programmed to, in response to parameters, including a battery state of charge and a battery capacity, indicating a minimized fuel consumption associated with a selected one of a plurality of possible distribution proportions for the first and second paths, actuate the valves to distribute the fluid according to the selected one.

10. The vehicle of claim 9 further including at least one electrical load, and wherein the parameters include a power demand of the at least one electrical load.

11. The vehicle of claim 9 wherein parameters include a speed-load profile of the engine.

12. The vehicle of claim 9 wherein the powertrain includes an engine and a transmission, and wherein the valves are further configured to selectively distribute the fluid flowing through the second path to a first heat exchanger for heating the engine and a second heat exchanger for heating the transmission, and the controller is further programmed to actuate the valves to distribute the fluid according to a distribution between the first heat exchanger and the second heat exchanger that results in minimum fuel consumption.

13. The vehicle of claim 9 wherein the controller is further programmed to actuate the valves to distribute the fluid to the second path in response to an engine temperature being less than a predetermined temperature.

14. The vehicle of claim 13 wherein the controller is further programmed to request an engine start in response to the engine temperature being less than the predetermined temperature.

15. A method comprising:
heating a fluid with exhaust gas from an engine; and
actuating, by a controller, one or more valves configured to proportion the fluid between a first path for generating electricity and a second path for heating a powertrain according to a selected one of a plurality of possible distribution proportions for the first and second paths that results in a minimum fuel consumption for a present battery operating condition.

16. The method of claim 15 wherein actuating the valves is further based on one or more of an engine temperature, an ambient temperature, and the present battery operating condition includes one or more of a state of charge of a battery and a capacity of the battery.

17. The method of claim 16 further comprising actuating, by the controller, the valves to distribute the fluid to the second path for heating the engine in response to the engine temperature being less than a predetermined temperature.

18. The method of claim 15 wherein the powertrain includes the engine and a transmission, and further comprising actuating, by the controller, the valves to distribute fluid flowing through the second path to a first heat exchanger associated with the transmission and a second heat exchanger associated with the engine.

* * * * *